United States Patent
Fink et al.

(10) Patent No.: US 9,698,394 B2
(45) Date of Patent: Jul. 4, 2017

(54) BATTERY HAVING A COVER THAT HAS PREDETERMINED BREAKING POINTS

(71) Applicants: Robert Bosch GmbH, Stuttgart (DE); Samsung SDI Co., Ltd., Yongin-si, Gyeonggi-do (KR)

(72) Inventors: Holger Fink, Stuttgart (DE); Stefan Butzmann, Schalksmühle (DE); Sarmimala Hore, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 367 days.

(21) Appl. No.: 14/264,339

(22) Filed: Apr. 29, 2014

(65) Prior Publication Data

US 2014/0329115 A1 Nov. 6, 2014

(30) Foreign Application Priority Data

May 3, 2013 (DE) ......................... 10 2013 208 137

(51) Int. Cl.
*H01M 2/02* (2006.01)
*H01M 2/10* (2006.01)
*H01M 2/12* (2006.01)

(52) U.S. Cl.
CPC ........ *H01M 2/1241* (2013.01); *H01M 2/1077* (2013.01); *H01M 2220/20* (2013.01)

(58) Field of Classification Search
CPC .. H01M 2/0202; H01M 2/105; H01M 2/1241; H01M 2/12; H01M 2/02; H01M 2/1252; H01M 2/1223; B60R 13/08

See application file for complete search history.

(56) References Cited

U.S. PATENT DOCUMENTS

| | | | | |
|---|---|---|---|---|
| 6,004,689 A | * | 12/1999 | Walker | H01M 2/0202 429/159 |
| 2003/0064283 A1 | * | 4/2003 | Uemoto | H01M 2/0202 429/149 |
| 2007/0238008 A1 | * | 10/2007 | Hogan | B60R 13/08 219/458.1 |

(Continued)

FOREIGN PATENT DOCUMENTS

| | | |
|---|---|---|
| DE | 10 2008 052 284 A1 | 4/2010 |
| DE | 10 2010 001 533 A1 | 8/2011 |

(Continued)

*Primary Examiner* — Kenneth Douyette
(74) *Attorney, Agent, or Firm* — Maginot, Moore & Beck LLP

(57) ABSTRACT

A battery includes at least two battery cells arranged adjacent to one another and each arranged in a battery cell housing. Each battery cell has at least one battery cell terminal. The battery also includes one degasification element per battery cell. Each degasification element is arranged within the battery cell housing associated with the respective battery cell and is configured to discharge gases generated within the respective battery cell from the respective battery cell in the presence of a predetermined gas pressure. The battery also includes a cover configured to cover at least a part of the surfaces of the battery cells and cover the degasification elements of the battery cells in air-tight fashion. The cover has, in each case in a region of the degasification elements, predetermined breaking points assigned to the degasification elements.

17 Claims, 1 Drawing Sheet

(56) References Cited

U.S. PATENT DOCUMENTS

2008/0220321 A1* 9/2008 Yonemochi ........... H01M 2/105
   429/89
2011/0287286 A1* 11/2011 Ahn .................... H01M 2/1241
   429/56
2012/0094156 A1    4/2012 Lim
2014/0370336 A1* 12/2014 Reitzle ................ H01M 2/1241
   429/56

FOREIGN PATENT DOCUMENTS

| DE | 10 2010 039 976 A1 | 3/2012 |
| DE | 10 2011 009 768 A1 | 8/2012 |
| DE | 10 2011 101 022 A1 | 11/2012 |
| DE | 10 2011 079 037 A1 | 1/2013 |
| DE | 10 2011 109 249 A1 | 2/2013 |
| DE | 10 2012 013 789 A1 | 1/2014 |
| EP | 2 388 846 A1 | 11/2011 |
| JP | 10-233198 A | 9/1998 |
| JP | 10-233199 A | 9/1998 |
| JP | 2000-182581 A | 6/2000 |

* cited by examiner

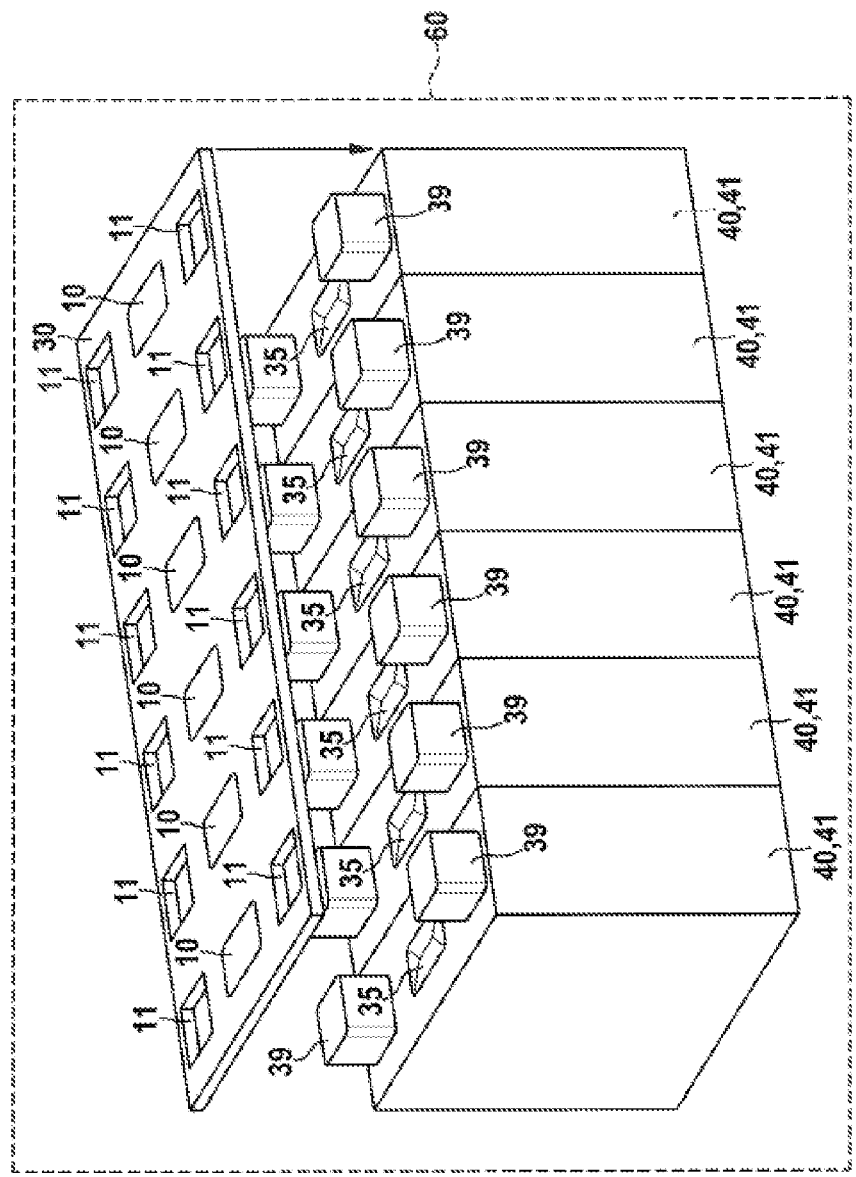

BATTERY HAVING A COVER THAT HAS PREDETERMINED BREAKING POINTS

This application claims priority under 35 U.S.C. § 119 to patent application number DE 10 2013 208 137.5, filed on May 3, 2013 in Germany, the disclosure of which is incorporated herein by reference in its entirety.

BACKGROUND

The present disclosure relates to a battery comprising at least two battery cells which are arranged adjacent to one another and which have in each case one degasification element, wherein the battery also comprises a cover which is configured to cover at least a part of the surfaces of the battery cells and cover the degasification elements of the battery cells in air-tight fashion and which has, in each case in the region of the degasification elements, predetermined breaking points that can be assigned to the degasification elements.

Battery packs or batteries, in particular lithium-ion battery packs or lithium-ion batteries for automotive applications, are presently manufactured from lithium-ion battery cells in VDA hard-case form. In other words, the batteries of the prior art nowadays have in particular lithium-ion battery cells arranged in each case in so-called hard-case battery cell housings, that is to say in battery cell housings that have a hard shell. Battery cells of said type normally have a battery cell housing which is composed partially or entirely of aluminum. To increase the voltage that can be provided by the battery packs or batteries, and/or to increase the current that can be provided by the battery packs or batteries, the individual battery cells within the battery pack or within the battery are connected in series and/or in parallel with one another to form battery modules. Said battery modules may then in turn be connected to one another to form battery packs or batteries.

Improper handling, for example overloading, damage or for example construction faults that lead for example to short circuits within the battery or contamination, can cause the batteries or the battery cells thereof to pass into a critical state. If the batteries or the individual battery cells are then not freed from said state in good time, this can lead to thermal runaway of the battery cells and thus to severe damage thereof. For this reason, in the prior art, so-called degasification elements are installed within the battery cell housings of the battery cells, which degasification elements are in each case configured to discharge gases generated within the respective battery cell from the respective battery cell in the presence of a predetermined gas pressure. In this way, gases and entrained particles are thus discharged from a, for example damaged, battery cell in the presence of a predetermined overpressure, and thus thermal runaway of said battery cell is prevented. In general, said process is associated with intense generation of heat. Here, degassing of a battery cell with the degasification element open normally takes place directly into the battery or into the battery pack in which the respective battery cell is installed. Alternatively, the escaping gas is accumulated and discharged via open or closed systems such as, for example, degasification ducts.

In the case of such systems, however there is in turn the risk of the substances that escape from a damaged battery cell attacking adjacent battery cells and of the temperature of the hitherto intact battery cells increasing into an inadmissible range, whereby the latter battery cells may likewise be damaged, as a result of the generation of heat within the battery or within the battery pack. For example, U.S. 2012/00941564 A1 describes a system of said type or a device for protecting the battery cells in the event of degassing, wherein the degasification elements of the battery cells, which in U.S. 2012/00941564 A1 are in the form of rupture diaphragms, are situated in an unprotected location within a degasification duct.

SUMMARY

According to the disclosure, a battery is provided which comprises at least two battery cells which are arranged adjacent to one another and which are each arranged in a battery cell housing and each have at least one battery cell terminal The battery also comprises one degasification element per battery cell, said degasification element being arranged in each case within the battery cell housing associated with the respective battery cell and being configured to discharge gases generated within the respective battery cell from the respective battery cell in the presence of a predetermined gas pressure. The battery also has a cover which is configured to cover at least a part of the surfaces of the battery cells and cover the degasification elements of the battery cells in air-tight fashion. According to the disclosure, the cover has, in each case in the region of the degasification elements, predetermined breaking points that can be assigned to the degasification elements.

If, for example during ongoing operation of the battery according to the disclosure, degassing of a battery cell of the battery occurs through the degasification element thereof, for example owing to the presence of excessively high temperatures or after an accident, the cover serves to protect the intact, that is to say non-degassing battery cells during said degassing process. It is thus not possible for any further battery cells of the battery to be damaged by substances escaping from the degassing battery cell or owing to the heat that is generated. A chain reaction in the thermal runaway of a battery cell is consequently prevented. At the same time, by means of the predetermined breaking points in the cover, the degassing of the battery cells concerned is not prevented.

The predetermined breaking points are preferably each configured to break when gas is discharged through the degasification element associated with the respective predetermined breaking point. In other words, it is preferably the case that each predetermined breaking point is configured to break when gas is discharged, or degassing occurs, through the degasification element that can be assigned to the predetermined breaking point. Here, the predetermined breaking points are preferably each arranged in a region of the cover that closes off in each case one degasification element of a battery cell in an air-tight manner. There are thus two states that the cover of the battery according to the disclosure can assume. In a first state, all of the predetermined breaking points are intact. If, for example, one degasification element of a battery cell of the battery ruptures, then the gas that escapes from the degasification element of said battery cell flows with a predetermined pressure against the predetermined breaking point, which can be assigned to the degasification element, of the cover, whereupon said predetermined breaking point breaks. If one or more predetermined breaking points have broken, the cover is in the second state. In said second state, the gas escaping from the degasification element of the battery cell concerned can also flow through the cover. The other degasification elements of the intact battery cells remain protected or covered in air-tight fashion by the cover such that the escaping, normally hot gas from the damaged battery cells cannot penetrate into the degasification elements of intact battery cells. The battery according to the disclosure is thus better protected against thermal runaway, and better protected against a chain reaction which is triggered by thermal runaway and which can cause damage to multiple battery cells, than batteries from the prior art.

The predetermined breaking points are preferably realized by perforations within the cover. By means of such perforations, the force required for breaking the predetermined breaking points, or the pressure required for breaking the predetermined breaking points, can be set in a precise manner.

Furthermore, the predetermined breaking points are preferably realized by local reductions in the thickness of the cover. Such local reductions in the thickness of the cover can be realized in a very simple manner and, furthermore, do not need to be introduced into the cover retroactively. It is thus advantageously possible for the cover to be manufactured in one working step without the need for reworking.

In one preferred embodiment, the predetermined breaking points are realized by local minimizations of the thickness of the cover. In other words, the cover is preferably reduced to a minimum in the region of the predetermined breaking points. With such exemplary embodiments, it can be ensured in a particularly effective manner that degassing of a battery cell via its degasification element leads to the predetermined breaking point that can be assigned to said degasification element being broken.

The predetermined breaking points are preferably in the form of island-like sections of the cover which in each case at least partially cover the degasification elements that can be assigned to the predetermined breaking points. In other words, the predetermined breaking points are preferably formed as sub-regions of the cover situated directly above the degasification elements that can be assigned to the predetermined breaking points, which sub-regions partially or completely overlap said degasification elements in an imaginary perpendicular projection of the degasification elements onto or into the cover.

The cover is preferably in the form of a plate. In such an embodiment, the battery can be of very compact configuration because the cover rests flat on the battery cells and takes up only a small space above the battery cells.

Is preferable for the cover to have cutouts through which in each case one battery cell terminal of the battery cells covered by the cover can extend. In this way, the cover can be connected to the battery cells in a particularly simple and space-saving manner.

The cover is preferably composed at least partially of a chemically resistant material. In such an embodiment, in the event of degassing of one of the battery cells of the battery, the remaining intact battery cells are better protected against an ingress of gas and in particular are better protected against the action of heat.

It is furthermore preferable for the cover to be composed at least partially of a heat-insulating and/or heat-reflective material. In such an embodiment, in the event of degassing of one of the battery cells of the battery, the remaining intact battery cells are protected particularly effectively against an ingress of gas and in particular are better protected against the action of heat.

In a preferred refinement of one of said embodiments, the material of the cover is selected from a group comprising aerogels and ceramics. Aerogels are highly porous solid bodies in which up to 99.98% of the volume consists of pores. Whereas aerogels are chemically highly resistant, heat-insulating materials, ceramics function as a good heat shield. Furthermore, the ceramics that are used preferably comprise zirconia, that is to say zirconium dioxide. Furthermore, the aerogels that are used are preferably polymer aerogels, that is to say polymers which include silica or silicon dioxide and/or polyimides. Aerogels are good heat insulators and are chemically inert.

Also provided is a motor vehicle having a battery according to the disclosure, wherein the battery is connected to a drive system of the motor vehicle.

The battery according to the disclosure preferably has lithium-ion battery cells.

The battery is preferably a lithium-ion battery.

Advantageous refinements of the disclosure are specified and described in the description.

BRIEF DESCRIPTION OF THE DRAWINGS

Exemplary embodiments of the disclosure will be explained in more detail on the basis of the drawings and the description below.

The FIGURE shows an exemplary embodiment of a battery according to the disclosure, with a cover detached from the battery cells of the battery.

DETAILED DESCRIPTION

The FIGURE illustrates an exemplary embodiment of a battery 60 according to the disclosure, with a cover 30 detached from the battery cells 40 of the battery 60. In other words, the battery 60 according to the disclosure illustrated in the FIGURE is illustrated in a state of incomplete assembly. The following description however relates to a battery 60 according to the disclosure in the fully assembled state, in which the cover 30 is fixedly connected to the battery cells 40 of the battery 60 according to the disclosure. In the exemplary embodiment illustrated in the FIGURE, the battery housing and a multiplicity of components (not shown in the FIGURE) of the battery 60 are merely indicated by means of a dashed line. In the exemplary embodiment of the FIGURE, merely by way of example, the battery 60 comprises multiple battery modules which, in turn, each have a multiplicity of battery cells 40 arranged adjacent one another and of which one is illustrated in the FIGURE. The battery cells 40 are each arranged in a battery cell housing 41 and, in this exemplary embodiment, merely by way of example, have in each case two battery cell terminals 39. Each battery cell 40 has a degasification element 35 which is arranged in each case within the battery cell housing 41 associated with the battery cell 40. Each degasification element 35 is configured to discharge gases generated within the respectively associated battery cell 40 from the respective battery cell 40 in the presence of a predetermined gas pressure. In other words, each of the battery cells 40 installed within the battery 60 has a degasification element 35, which in this exemplary embodiment, merely by way of example, are each installed into the covers of the battery cell housing 41 of the battery cells 40, in each case between the battery cell terminals 35 of the battery cells 40. In this exemplary embodiment, the degasification elements 35 are, merely by way of example, in the form of rupture diaphragms. It is however also possible for batteries 60 according to the disclosure to be formed in which the degasification elements 35 are of different configuration, for example in the form of overpressure valves, or else of very different configuration. If the gas pressure within one of the battery cells 40 reaches a predetermined value, the degasification element 35 of said battery cell 40 ruptures, and degassing of said battery cell 40 occurs, such that gas contained in said battery cell 40, and the electrolyte contained in said battery cell 40, can escape from the degasification element 35.

The battery 60 according to the disclosure also has a cover 30 which, in this exemplary embodiment, merely by way of example, is configured to cover the surfaces of the battery cells 40 at the battery cell terminal side and to cover all of the degasification elements 35 of the battery cells 40 in an air-tight manner. In the FIGURE, the cover 30 is, for illustrative purposes, illustrated floating above the battery module shown. In the assembled state of the battery 60 according to the disclosure, the cover 30 in this exemplary embodiment is configured, merely by way of example, to cover only the battery cells 40 illustrated, that is to say to cover the battery cells 40 of only one battery module, that is to say of the battery module shown. It is however also possible for batteries 60 according to the disclosure to be realized in which the cover 30 is configured to simultaneously cover the battery cells 40 of multiple or all battery modules of the battery 60, or else to cover only some of the battery cells 40 of a battery module. Furthermore, batteries 60 according to the disclosure may also be realized in which the cover 30 is configured not only to cover the surfaces of the battery cells 40 at the battery cell terminal side but also to cover further surfaces, or all of the surfaces, of the battery cells 40. The cover 30 of the battery cells 40 is, as a ready mentioned, also configured to cover the degasification elements 35 of the battery cells 40 in an air-tight manner, that is to say to close off said degasification elements in an air-tight manner.

The cover 30 has, in each case in the region of the degasification elements 35, predetermined breaking points 10 that can be assigned to the degasification elements 35. In other words, the cover 30 of the battery 60 has a multiplicity of predetermined breaking points 10, of which, in the fully assembled state of the battery 60, in each case one can be unequivocally assigned to precisely one degasification element 35, and vice versa. Here, the assignment may be established for example by means of the local distance between the predetermined breaking points 10 and the degasification elements 35, such that a predetermined breaking point 10 can for example be assigned to the degasification element 35 situated closest thereto. In other words, in each case precisely one predetermined breaking point 10 of the cover 30 is situated in each case in one of those regions of the cover 30 which covers in each case precisely one degasification element 35 in an air-tight manner.

In this exemplary embodiment, the predetermined breaking points 10 are each configured to break when gas is discharged through the degasification element 35 associated with the respective predetermined breaking point 10. In other words, in this exemplary embodiment, merely by way of example, each of the predetermined breaking points 10 is configured to break or to rupture when degassing occurs through the degasification element 35 assigned to the predetermined breaking point 10. Accordingly, if thermal runaway of a battery cell 40 occurs and, as a result, the gas pressure within said battery cell 40 increases up to the predetermined gas pressure, the degasification element 35 of said battery cell 40 ruptures or opens. In other words, an outflow of gas occurs from the degasification element 35 of the battery cell 40 that experiences thermal runaway, which gas is normally at a high temperature. Then, under the predetermined breaking point 10 that can be assigned to the degasification element 35 of the degassing battery cell 40, a pressure very rapidly builds up which causes said predetermined breaking point 10 to break. The normally hot gas from the battery cell 40 that experiences thermal runaway thus escapes into the cavity situated between the cover 30 and the battery housing of the battery 60 (not illustrated). The other battery cells 40 of the battery 60 are protected from the escaping gas by the cover 30 including the remaining, still intact predetermined breaking points 10.

In this exemplary embodiment, the cover 30 is, merely by way of example, in the form of a plate. It is however also possible for batteries 60 according to the disclosure to be formed with covers 30 which are of some other form, that is to say are not in the form of a plate. Furthermore, in this exemplary embodiment, the predetermined breaking points 10 are, merely by way of example, in the form of island-like sections of the cover 30 which, when the battery 60 is in the fully assembled state, in each case completely cover the degasification elements 35 that can be assigned to the predetermined breaking points 10. In this exemplary embodiment, merely by way of example, the predetermined breaking points 10 are each of rectangular shape with rounded corners. Merely by way of example, the degasification elements 35 also have this shape in this exemplary embodiment. In the fully assembled state, the predetermined breaking points 10 of the cover 30 are situated, merely by way of example, congruently above the degasification elements 35, such that the area of the degasification elements 35 is completely covered by the area of the predetermined breaking points 10.

In this exemplary embodiment, merely by way of example, the predetermined breaking points 10 are realized by local reductions, or more specifically local minimizations, of the thickness of the cover 30. In other words, the above-described island-like sections that form the predetermined breaking points 10 are formed with a minimal wall thickness, that is to say with a minimum thickness of the cover 30. The minimum thickness of the cover 30 is in this case restricted to an expedient value, that is to say to a thickness which is still great enough to withstand vibrations of the battery 60 but which is only so great that the predetermined breaking points 10 break in the presence of a predetermined second gas pressure. In this exemplary embodiment, merely by way of example, the predetermined second gas pressure lies below the predetermined gas pressure at which a degasification element 35 of the battery cells 40 ruptures. Other batteries 60 according to the disclosure may however also be realized in which the predetermined breaking points 10 within the cover are realized in some other way, for example by means of perforations within the cover 30, or else are realized in a very different way.

In this exemplary embodiment, the cover 30 furthermore has cutouts 11 which are adapted in terms of their shape to the battery cell terminals 39 of the battery cells 40, through which cutouts in each case one battery cell 39 of the battery cells 40 covered by the cover 30 can extend. In other words, in this exemplary embodiment, merely by way of example, the cover 30 has two cutouts 11 per battery cell 40, through which cutouts the battery cell terminals 39 of the battery cells 40 can extend in each case such that the cover 30 can be fixed loosely to the battery cell terminals 39 of the battery cells 40.

In this exemplary embodiment, the cover 30 is composed entirely of a chemically resistant, heat-insulating and heat-reflective material, which in this exemplary embodiment, merely by way of example, is a high-temperature ceramic comprising zirconia, that is to say zirconium dioxide. Batteries 60 according to the disclosure may however also be realized in which the cover 30 is composed only partially, or even not at all, of a high-temperature ceramic. The cover 30 of a battery 60 according to the disclosure may for example also be composed entirely or at least partially of an aerogel, which optionally comprises for example silicon dioxide and/or polyimides, or else of a very different substance or material. Furthermore, the material selected for forming the cover 30 also need not imperatively be a chemically resistant or heat-insulating and/or heat-reflective material.

What is claimed is:

1. A battery, comprising:
    at least two battery cells arranged adjacent to one another and each arranged in a battery cell housing, each battery cell having at least one battery cell terminal;
    one degasification element per battery cell, each degasification element arranged within the battery cell housing associated with the respective battery cell and configured to discharge gases generated within the respective battery cell from the respective battery cell in a presence of a predetermined gas pressure; and
    a cover configured to cover at least a part of surfaces of the battery cells and cover the degasification elements of the battery cells in air-tight fashion,
    wherein:
        the cover is composed at least partially of at least one of a chemically resistant material, a heat-insulating material and a heat-reflective material;
        the cover is composed at least partially from at least one of an aerogel material and a ceramic material; and
        the at least one of an aerogel material and a ceramic material of the cover defines a respective predetermined breaking point for each of the degasification elements, each predetermined breaking point in a region of a corresponding degasification element.

2. The battery according to claim 1, wherein each predetermined breaking point is configured to break when gas is discharged through the degasification element associated with the respective predetermined breaking point.

3. The battery according to claim 1, wherein the predetermined breaking points are perforations within the cover.

4. The battery according to claim 1, wherein the predetermined breaking points are local reductions in a thickness of the cover.

5. The battery according to claim 4, wherein the predetermined breaking points are local minimizations of the thickness of the cover.

6. The battery according to claim 1, wherein the predetermined breaking points are formed as island-like sections of the cover which each at least partially cover the degasification elements assigned to the predetermined breaking points.

7. The battery according to claim 1, wherein the cover is formed as a plate.

8. The battery according to claim 1, wherein the cover has cutouts through each of which one battery cell terminal of the battery cells covered by the cover can extend.

9. A motor vehicle, comprising:
    a drive system; and
    a battery, including:
        at least two battery cells arranged adjacent to one another and each arranged in a battery cell housing, each battery cell having at least one battery cell terminal;
        one degasification element per battery cell, each degasification element arranged within the battery cell housing associated with the respective battery cell and configured to discharge gases generated within the respective battery cell from the respective battery cell in a presence of a predetermined gas pressure; and
        a cover configured to cover at least a part of surfaces of the battery cells and cover the degasification elements of the battery cells in air-tight fashion,
    wherein:
        the cover is composed at least partially of at least one of a chemically resistant material, a heat-insulating material and a heat-reflective material;
        the cover is composed at least partially from at least one of an aerogel material and a ceramic material; and
        the at least one of an aerogel material and a ceramic material of the cover defines a respective predetermined breaking point for each of the degasification elements, each predetermined breaking point in a region of a corresponding degasification element,
    and
    wherein the battery is connected to the drive system of the motor vehicle.

10. A battery, comprising:
    at least two battery cells arranged adjacent to each other and each arranged in a respective battery cell housing, each battery cell having at least one battery cell terminal;
    one degasification element per battery cell, each degasification element arranged within the battery cell housing associated with the respective battery cell and configured to discharge gases generated within the respective battery cell from the respective battery cell in a presence of a predetermined gas pressure; and
    a rigid plate that forms a cover configured to cover at least a part of surfaces of the battery cells and cover the degasification elements of the battery cells in air-tight fashion,
    wherein the cover has a respective predetermined breaking point assigned to each the degasification elements, each predetermined breaking point in a region of a corresponding degasification element.

11. The battery according to claim 10, wherein each predetermined breaking point is configured to break in response to gas being discharged through the degasification element associated with the respective predetermined breaking point.

12. The battery according to claim 10, wherein the predetermined breaking points are defined by perforations within the cover.

13. The battery according to claim 10, wherein the predetermined breaking points defined by local reductions in a thickness of the cover.

14. The battery according to claim 13, wherein the local reductions in the thickness of the cover are local minimizations of the thickness of the cover.

15. The battery according to claim 10, wherein the plate further defines a plurality of cutouts, the at least one terminal of each of the battery cells extending through a respective one of the cutouts.

16. The battery according to claim 10, wherein the plate is formed from material that is at least one of chemically resistant, heat insulating, and heat reflective.

17. The battery according to claim 16, wherein the predetermined breaking points of the cover are formed from at least one of an aerogel material and a ceramic material.

* * * * *